US006822816B2

United States Patent
Dakroub

(10) Patent No.: US 6,822,816 B2
(45) Date of Patent: Nov. 23, 2004

(54) ELECTRICAL DETECTION OF LOW FLYING READ/WRITE HEAD FOR A DISC DRIVE

(75) Inventor: Housan Dakroub, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 252 days.

(21) Appl. No.: 10/280,480

(22) Filed: Oct. 24, 2002

(65) Prior Publication Data

US 2003/0218813 A1 Nov. 27, 2003

Related U.S. Application Data

(60) Provisional application No. 60/382,989, filed on May 23, 2002.

(51) Int. Cl.[7] .................................. G11B 27/36
(52) U.S. Cl. ............................ 360/31; 360/75
(58) Field of Search ................ 360/31, 75, 66, 360/77.03, 78.11; 324/210, 212, 226; 369/53.43, 53.1, 53.38, 53.42

(56) References Cited

U.S. PATENT DOCUMENTS

| 5,557,399 A | 9/1996 | de Groot |
|---|---|---|
| 5,600,441 A | 2/1997 | de Groot et al. |
| 5,953,125 A | 9/1999 | de Groot |
| 5,991,122 A | 11/1999 | Tangren et al. |
| 6,212,042 B1 | 4/2001 | Gui et al. |
| 6,700,724 B2 * | 3/2004 | Knippenberg et al. ........ 360/69 |
| 2002/0105750 A1 | 8/2002 | Li et al. |
| 2004/0032681 A1 * | 2/2004 | Smith et al. .................. 360/31 |

* cited by examiner

Primary Examiner—Alan T. Faber
(74) Attorney, Agent, or Firm—Fellers, Snider, et al.

(57) ABSTRACT

A method for determining presence or absence of a low flying read/write head is disclosed. In a preferred embodiment, a disc is accelerated to an operating rotational velocity, a voltage is applied across a magnetoresistive element of the read/write head, the voltage applied across the magnetoresistive element is monitored for an occurrence of a contact event voltage signature, a level of the voltage applied across the magnetoresistive element concurrent with the occurrence of the contact event voltage signature is determined and compared to a predetermined applied voltage threshold to determine presence of a low flying read/write head.

Occurrence of a contact event voltage signature prior to reaching the predetermined applied voltage threshold identifies the read/write head as a low flying read/write head. Non-occurrence of a contact event voltage signature prior to reaching the predetermined applied voltage threshold identifies the read/write head is a non low flying read/write head.

20 Claims, 4 Drawing Sheets

ELECTRICAL DETECTION OF LOW FLYING READ/WRITE HEAD FOR A DISC DRIVE

RELATED APPLICATIONS

This application claims priority to U.S. Provisional Application No. 60/382,989 filed May 23, 2002, entitled Electrical Slider Contact Detection.

FIELD OF THE INVENTION

This invention relates generally to the field of magnetic data storage devices, and more particularly, but not by way of limitation, to identifying a low flying read/write head of a disc drive based on detection of an electro-static voltage discharge.

BACKGROUND

Disc drives are used for data storage in modern electronic products ranging from digital cameras to computers and network systems. Typically a disc drive includes a mechanical portion and an electronics portion in the form of a printed circuit board assembly that controls functions of the mechanical portion while providing a communication interface to a host being serviced by the disc drive.

Typically, the mechanical portion, or head-disc assembly, has a disc with a recording surface rotated at a constant speed by a spindle motor assembly and an actuator assembly positionably controlled by a closed loop servo system for use in accessing the stored data. The actuator assembly commonly supports a magnetoresistive read/write head that writes data to and reads data from the recording surface. Normally, the magnetoresistive read/write head uses an inductive element, or writer, to write data to and a magnetoresistive element, or reader, to read data from the recording surface.

The disc drive market continues to place pressure on the industry for disc drives with increased capacities, higher data rates and lower costs. A key aspect of achieving lower costs is an identification of marginal components as early as practical in the manufacturing process to preclude needless accrual of additional manufacturing costs and costly rework operations in subsequent processes. Additionally, an ability to identify, remove and replace marginal components from a disc drive prior to shipment is an aid in reduction of field failure and warranty expense.

A critical component of a disc drive is the magnetoresistive read/write head. As each read/write head passes through manufacturing processes in preparation for use in a disc drive, costs associated with those processes accrue and contribute to the overall cost of the disc drive. By measuring characteristics of the read/write head throughout the manufacturing process, defective and marginal read/write heads can be culled from the process before additional costs are needlessly applied.

Fly height of a read/write head is an important operating characteristic of the read/write head for proper operation of the disc drive. A read/write head with a fly height greater than a specified nominal fly height will typically display poor data transfer characteristics and is generally replaced. However, a read/write head with a fly height lower than the specified nominal fly height will typically display good data transfer characteristics and, unless detected, is generally not replaced. An undetected low fly head within a disc drive poses an increased risk to subsequent failure of the disc drive over the useful life of the disc drive.

As such, challenges remain and a need persists for effective techniques for determining a low flying read/write head within a disc drive throughout the disc drive manufacturing process. It is to this and other features and advantages set forth herein that embodiments of the present invention are directed.

SUMMARY OF THE INVENTION

In accordance with preferred embodiments, an apparatus for facilitating electrical detection of low flying read/write heads of a disc drive through implementation of a contact event detection routine is provided. A preferred embodiment of the apparatus includes a voltage source applying a voltage across the magnetoresistive element to induce an electrostatic charge on the surface of the read/write head, a test resistor positioned between the voltage source and the magnetoresistive element works in conjunction with the voltage source to limit the current through the magnetoresistive element, a control circuit monitoring voltage applied across the magnetoresistive element for detection of a contact event voltage signature, and a display device connected to the control circuit displaying the contact event voltage signature.

An alternate preferred embodiment of the apparatus includes a preamplifier/driver of the disc drive configured with a low fly height detection circuit communicating with the read/write head. The read/write head has a magnetoresistive element and an external surface, which includes an air bearing surface.

The low fly height detection circuit includes a differential voltage source applying a selected bias voltage across the magnetoresistive element to bring the magnetoresistive element to an operative state and a bias resistor connected between the differential power source and the magnetoresistive element operating in conjunction with the differential voltage source to maintain the selected bias voltage across the magnetoresistive element.

The low fly height detection circuit further includes a common mode voltage source electrically connected to the differential voltage source for use in incrementally inducing an electrostatic charge on the surface of the read/write head and a test resistor electrically connected between the common mode voltage source and the magnetoresistive element operating in conjunction with the common mode voltage source to maintain the electrostatic charge on the surface of the read/write head.

The low fly height detection circuit still further includes an output line attached between the test resistor and the magnetoresistive head for monitoring for an occurrence of the contact event voltage signature, the occurrence of the contact event voltage signature constitutes determination of a low flying read/write head.

The contact event detection routine is executable by either the preferred embodiment of the apparatus or the alternate preferred embodiment of the apparatus. Steps of contact event detection routine include, accelerating a disc to an operating rotational velocity, applying a voltage across a magnetoresistive element of the read/write head, the voltage applied across the magnetoresistive element is monitored for an occurrence of a contact event voltage signature.

Upon an occurrence of a contact event voltage signature, determining a level of the voltage applied across the magnetoresistive element concurrent with the occurrence of the contact event voltage signature is a following step, and comparing the voltage applied across the magnetoresistive element to a predetermined applied voltage threshold to determine presence of a low flying read/write head, after which each identified low flying read/write head is replaced and the routine ends.

Occurrence of a contact event voltage signature prior to reaching the predetermined applied voltage threshold identifies the read/write head as a low flying read/write head. Non-occurrence of a contact event voltage signature prior to reaching the predetermined applied voltage threshold identifies the read/write head is a non low flying read/write head.

These and various other features and advantages that characterize the claimed invention will be apparent upon reading the following detailed description and upon review of the associated drawings.

DETAILED DESCRIPTION

Figure 1:
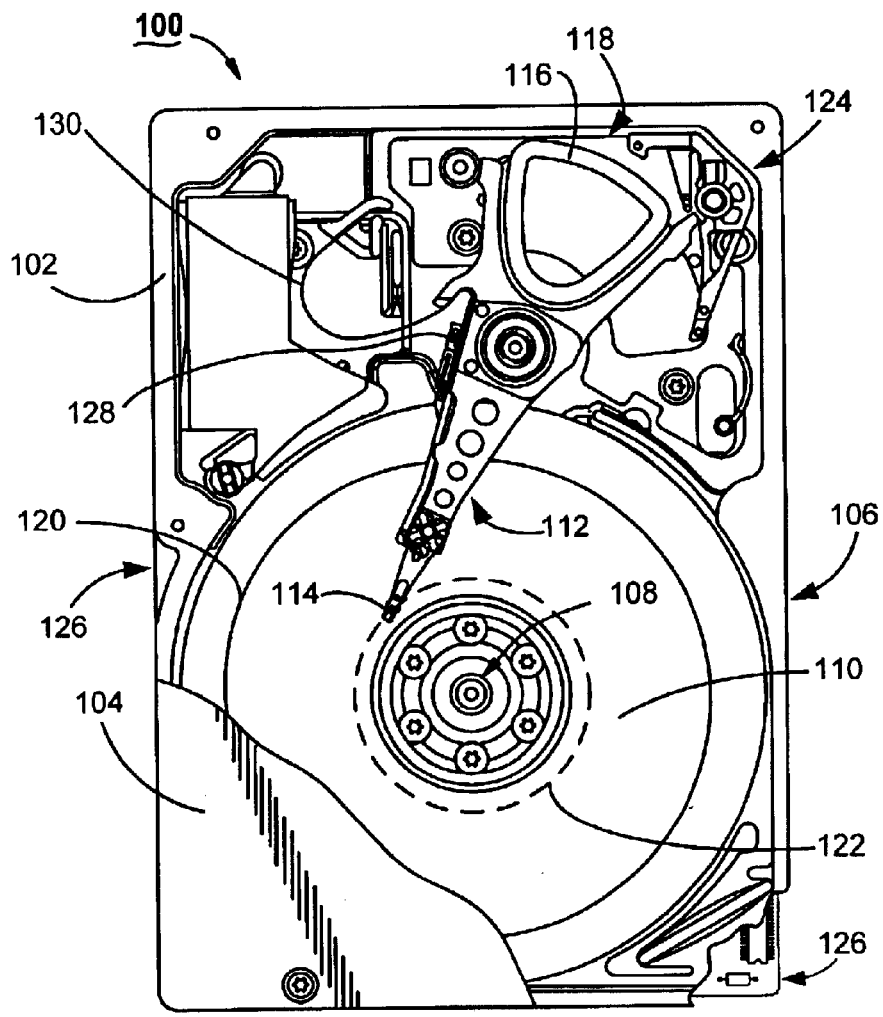
FIG. 1 is a plan view of a disc drive constructed and operated in accordance with preferred embodiments of the present invention.

Referring now to the drawings, FIG. 1 provides a top plan view of a disc drive 100. The disc drive 100 includes a rigid base deck 102, which cooperates with a top cover 104 (shown in partial cutaway) to form a sealed housing for a mechanical portion of the disc drive 100. Typically, the mechanical portion of the disc drive 100 is referred to as a head disc assembly 106. A spindle motor 108 rotates a number of magnetic data storage discs 110 at a constant high speed. A rotary actuator 112 supports a number of data transducing heads 114 adjacent the discs 110. The actuator 112 is rotated through application of current to a coil 116 of a voice coil motor (VCM) 118.

During data transfer operations with a host device (not shown), the actuator 112 moves the heads 114 to concentric data tracks (one represented at 120) on the surfaces of the discs 110 to write data to and read data from the discs 110. When the disc drive 100 is deactivated, the actuator 112 moves the heads 114 to texturized landing zones 122; the actuator 112 is then confined by latching a toggle latch 124.

Command and control electronics, as well as other interface and control circuitry for the disc drive 100, are provided on a printed circuit board assembly 126 mounted to the underside of the base deck 102. A primary component for use in conditioning read/write signals passed between the command and control electronics of printed circuit board assembly 126 and the read/write head 114 is a preamplifier/driver (preamp) 128, which prepares a read signal read from a data track, such as 120, by the read/write head 114 for processing by read/write channel circuitry (not separately shown) of the printed circuit board assembly 126. Typically, the preamp 128 is attached to a flex circuit 130, which conducts signals between the printed circuit board assembly 126 and the read/write head 114 during data transfer operations.

Figure 2:
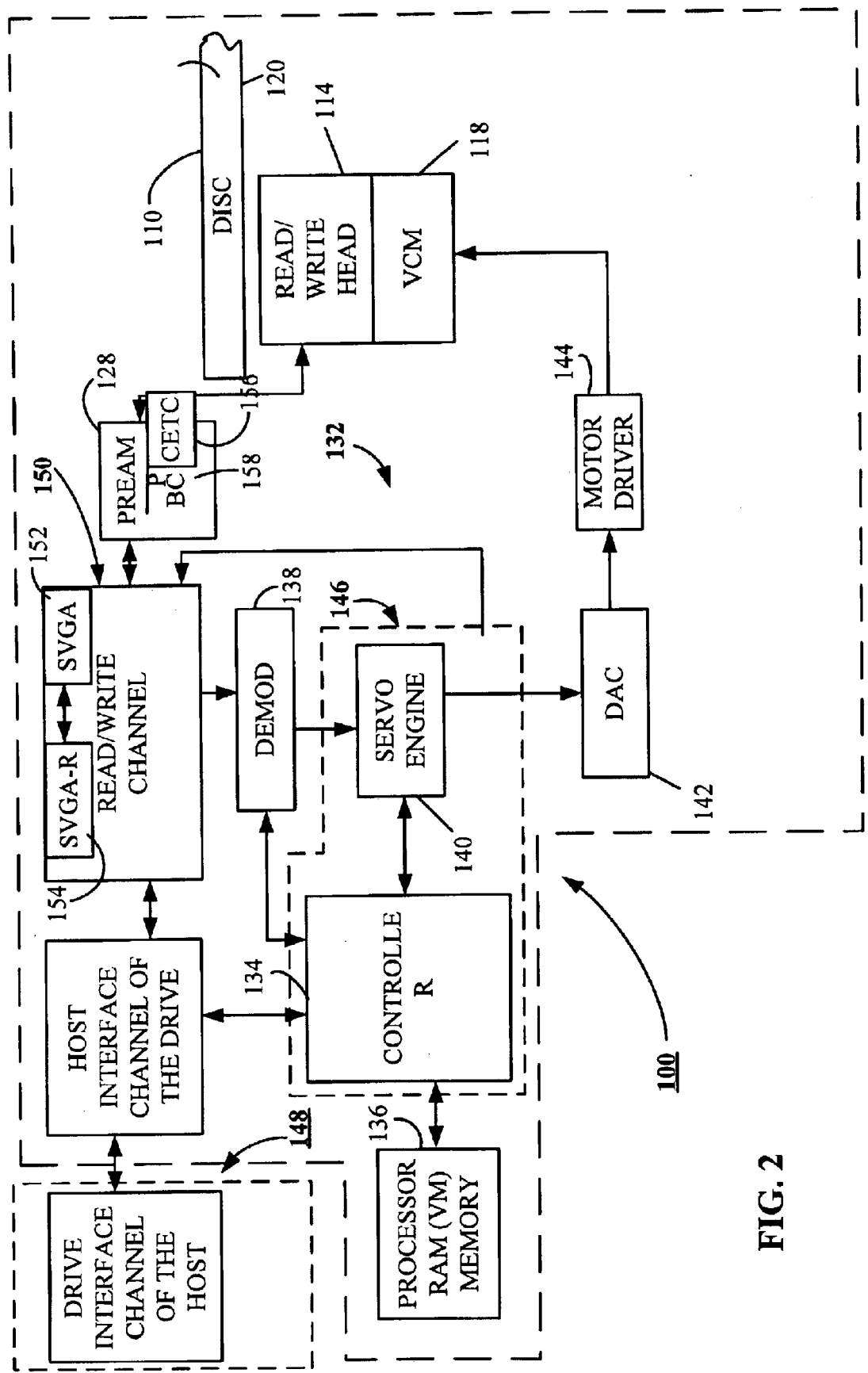
FIG. 2 is a functional block diagram of a circuit for controlling operation of the disc drive of FIG. 1 and in determining a fly height status of a read/write head of FIG. 1.

Turning to FIG. 2, position-controlling of the read/write head 114 is provided by the positioning mechanism (not separately shown) operating under the control of a servo control circuit 132 programmed with servo control code, which forms a servo control loop.

The servo control circuit 132 includes a micro-processor controller 134 (also referred to herein as controller 134), a volatile memory or random access memory (VM) 136, a demodulator (DEMOD) 138, an application specific integrated circuit (ASIC) hardware-based servo controller ("servo engine") 140, a digital to analog converter (DAC) 142 and a motor driver circuit 144. Optionally, the controller 134, the random access memory 136, and the servo engine 140 are portions of an application specific integrated circuit 146.

Typically, a portion of the random access memory 136 is used as a cache for data read from the information track 120 awaiting transfer to a host connected to the disc drive 100, and for data transferred from the host to the disc drive 100 to be written to the information track 120. The components of the servo control circuit 132 are utilized to facilitate track following algorithms for the actuator 112 (of FIG. 1) and more specifically for controlling the voice coil motor 118 in position-controlling the read/write head 114 relative to the selected information track 120 (of FIG. 1).

The demodulator 138 conditions head position control information transduced from the information track 120 of the disc 110 to provide position information of the read/write head 114 relative to the disc 110. The servo engine 140 generates servo control loop values used by the controller 134 in generating command signals such as seek signals used by voice coil motor 118 in executing seek commands. Control loop values are also used to maintain a predetermined position of the actuator 112 during data transfer operations.

The command signals generated by the controller 134 and passed by the servo engine 140 are converted by the digital to analog converter 142 to analog control signals. The analog control signals are used by the motor driver circuit 144 in position-controlling the read/write head 114 relative to the selected information track 120, during track following, and relative to the surface of the disc 110 during seek functions.

In addition to the servo control code program of the application specific integrated circuit 146, control code is also programmed into the application specific integrated circuit 146 for use in executing and controlling data transfer functions between a host 148 and the disc drive 100. Read/write channel electronics 150, operating under control of the controller 134 executing the control code, passes data received from the host 148 to the read/write head 114 for storage on the disc 110 and passes data read by the read/write head 114 from the disc 110 back to the host 148.

The read/write channel electronics 150 includes a servo variable gain amplifier (SVGA) 152, which amplifies an amplitude of a head position control signal read from the information track 120. The amplified amplitude of the head position control signal, provided by the servo variable gain amplifier 152, is stored in a servo variable gain amplifier register 154 for subsequent release to, and processing by, the servo engine 140.

It will be recognized that the height (distance) that a given read/write head 114 flies above an associated disc surface of the disc 110 will generally depend upon the rotational speed of the discs 110 and the particular characteristics of the head. While all of the heads 114 in a particular disc drive are designed to nominally fly at the same height for a selected rotational speed of the discs 110 (i.e., a nominal operational fly height), some amount of manufacturing variations will tend to be present in a given population of heads.

Thus, in a given disc drive 100, some heads will tend to fly at a slightly higher than nominal operational fly height while other heads will tend to fly at a slightly lower than nominal operational fly height. The lowest flying read/write head 114 in a disc drive 100 will typically interact with its corresponding disc surface, either through an electrical discharge of a charge built up on the surface of the read/write head 114 or through physical interaction with the disc 110, before the other heads 114 in the drive as the discs 110 are decelerated to rest.

A particularly low flying head can accordingly pose a long term reliability risk for the drive. Electrical discharge via an arc can pit (i.e., erode or burn a small portion) the surface of the disc 110 causing a loss of data and discontinuity of the surface of the disc 110. While premature physical interaction between the read/write head 114 and the disc 110 can create excessive deterioration of the surface of the disc 110 or wear of the read/write head 114.

Drive manufacturers have employed a number of different methodologies in an attempt to screen for low flying heads during disc drive manufacturing operations. The present invention (as embodied herein and as claimed below) provides a novel approach to identify the fly height characteristics of a selected read/write head 114. This novel approach entails monitoring for a change in a test voltage level applied to the read/write head 114. The change in the test voltage level is due either to a premature electrostatic discharge from the read/write head 114 to the disc 110 or a premature physical interaction between the read/write head 114 and the disc 110. Monitoring for a change in the value of the test voltage is carried out by a contact event test circuit (CETC) 156 portion of the preamp 128.

The contact event test circuit 156 interacts with a bias circuit (BC) 158 by supplying a test voltage to a magnetoresistive element (not shown separately) to induce a charge on the surface of the read/write heads 114 while the disc drive 100 is operating under nominal operating conditions. As the charge induces, an electrostatic attraction develops between the read/write head 114 and the disc 110, which attracts the read/write head 114 toward the disc 110. As the read/write head 114 comes into close proximity to the disc 110, either the charge on the read/write head 114 will discharge to the disc 110, or the read/write head 114 will physically interact with the disc 110. In either case, a contact event takes place. The effect of an occurrence of a contact event is a momentary drop in the voltage level of the test voltage. By monitoring the voltage level of the test voltage, an occurrence of a contact event can be detected.

The voltage level of the test voltage is empirically determined for each distinct disc drive model. A test voltage set at an excessively high voltage level will cause substantially all of the read/write heads 114 of the disc drive 100 to encounter a contact event, while a test voltage set at an insufficiently low voltage level will avoid an occurrence of a contact event by substantially any of the read/write heads 114. A voltage level of a test voltage is empirically determined for each distinct disc drive model, such that when applied to a nominally flying read/write head 114, a contact event fails to occur, but when applied to a low flying read/write head, a contact event will occur.

In other words, a threshold voltage level for the test voltage is established for each distinct disc drive model to screen of low flying read/write heads 114. While incrementally applying the test voltage from zero volts to the threshold voltage level to each read/write head 114 of the disc drive 100, the voltage level of the test voltage is monitored at the read/write head 114.

If a drop in voltage of sufficient magnitude occurs prior to attainment of the threshold voltage level of the test voltage, a contact event is deemed to have occurred and the offending read/write head 114 is removed and replaced. If the threshold level for the test voltage applied to the read/write head 114 is attained absent an occurrence of a drop in voltage of sufficient magnitude, as measured at the read/write head 114, the non-offending read/write head 114 is deemed to be a non-low flying read/write 114. In a preferred embodiment, the threshold voltage level is about 0.5 volts (+ or −5%) and the drop in voltage associated with a contact event is in the range of 200 millivolts. Continued application of the test voltage at the threshold level will cause reoccurrences of voltage drops as the charge on the read/write head 114 replenishes to the point of discharge, thereby providing a contact event voltage signature.

Figure 3:
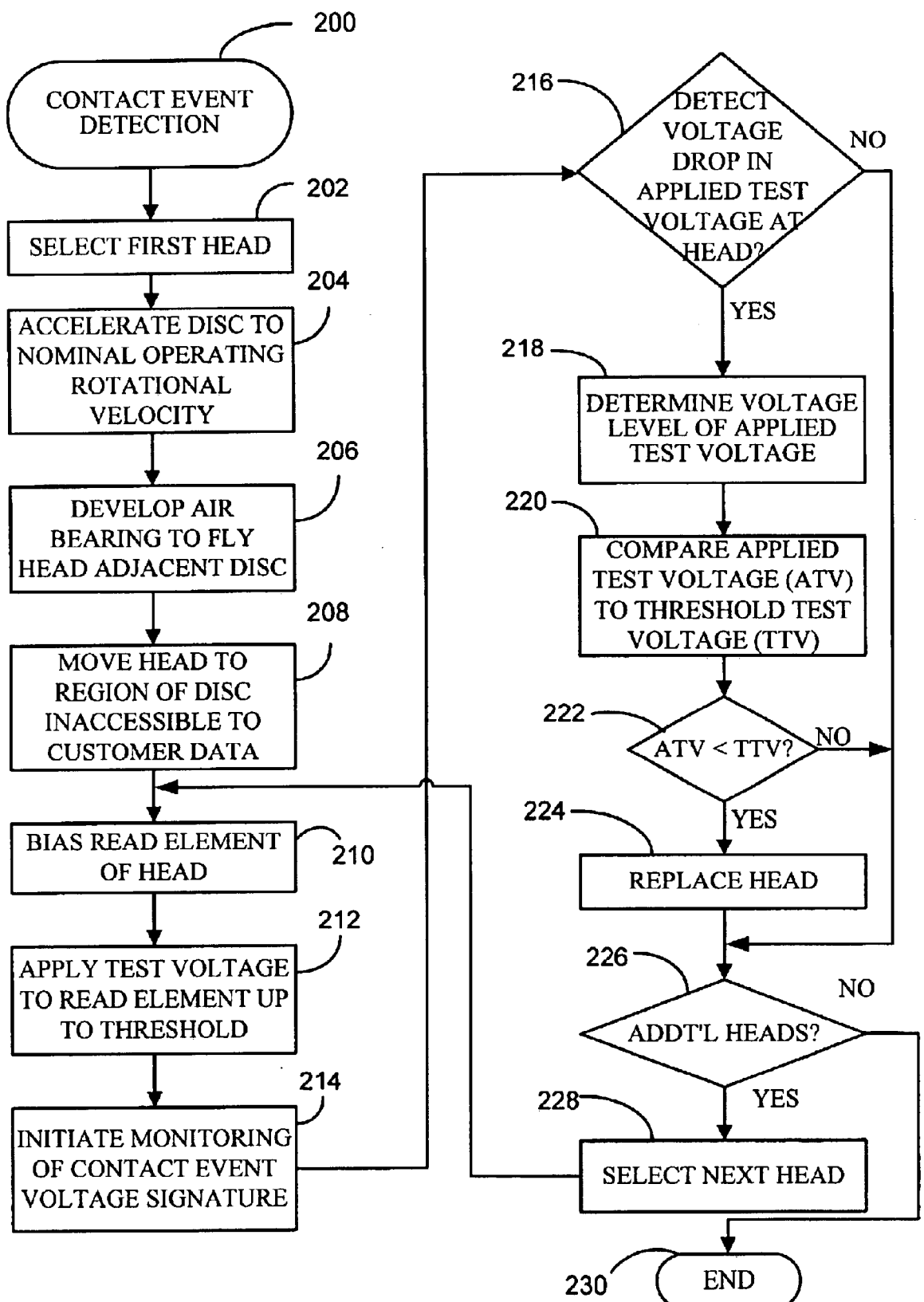
FIG. 3 is a flow chart of a contact event detection routine for characterizing the fly height status of a read/write head of the disc drive of FIG. 1.

FIG. 3 provides a flow chart for contact event detection routine 200, generally illustrative of steps carried out in accordance with preferred embodiments of the present invention. The routine is preferably carried out during manufacturing using a test stand or other suitable test equipment for a population of heads (such as 114). The routine can also be carried out within the confines of a disc drive (such as 100), as desired.

The first head to be tested is selected at step 202, and the associated disc (such as 110) is accelerated at step 204 to a nominal rotational velocity. This results in the generation of an air bearing sufficient to fly the read/write head 114 adjacent the disc surface, as indicated by step 206. The read/write head 114 is moved at step 208 to a position adjacent a region of the disc surface inaccessible for storage of customer data (such as the landing zone 122).

An appropriate biasing of the read/write head 114 (such as through application of a low level read bias current) is applied at step 210. At step 212, a predetermined test voltage is incrementally applied from zero volts to a predetermined threshold voltage. Monitoring for an occurrence of a contact event is initiated at step 214. At this point, as the applied test voltage is increased, an electrostatic charge begins to induce on the surface of the read/write head 114.

The threshold voltage of the test voltage is empirically determined for each disc drive 100 model. That threshold is established such that a rate of dissipation of the electrostatic charge from the surface of the read/write head is sufficient to preclude a discharge of the electrostatic charge across the air bearing to the surface of the corresponding disc 110 for a nominally flying read/write head 114. However, for a low flying read/write head 114 or for a read/write head 114 that encounters a physical interaction with the surface of the corresponding disc 110, the rate dissipation of the electrostatic charge, resulting from the application of the bias and the test voltage to the threshold level, is insufficient to preclude a discharge of the electrostatic charge across the air bearing to the surface of the corresponding disc 110. A momentary drop in the voltage level of the applied test voltage occurs at the read/write head 114, as a result of the discharge of the electrostatic charge, which constitutes a contact event. The occurrence of such an event is detected at step 216.

If a contact event is detected at step 216, the voltage level of the test voltage being applied at the time of the contact event is identified, step 218, and compared to the predetermined test voltage threshold at step 220. Whether or not the applied test voltage is less than the threshold test voltage is determined at step 222, and if the applied test voltage is less than the threshold test voltage, the offending read/write head 114 is replaced at step 224.

Absent detection of a contact event at step 216, or presence of an applied test voltage greater than the threshold test voltage at step 222 results in an inquiry at step 226 as to whether all read/write heads 114 had been tested. If additional heads remain of analysis, the process continues with step 228, if not, the process continues to end step 230.

The contact event detection routine 200 may be implemented either through use of a standalone test system or by the disc drive 100 with adaptations to the preamp 128 (of FIG. 2).

Figure 4:
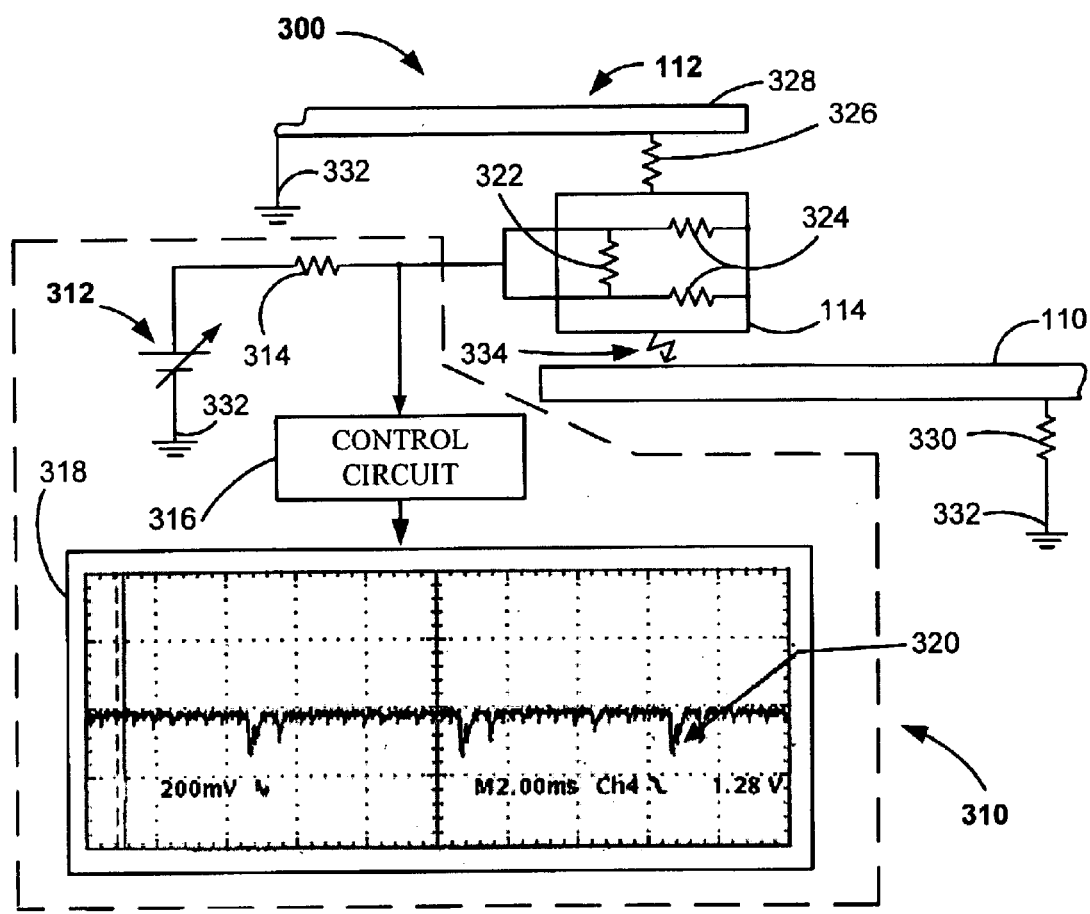
FIG. 4 is a functional block diagram of a circuit of a standalone test system for use in determining a fly height status of a read/write bead of FIG. 1.

FIG. 4 shows a functional block diagram of a standalone test system 300 configured to carry out the routine of FIG. 3 in accordance with a preferred embodiment of the present invention. The standalone test system 300 includes several components discussed above including the disc 110, read/write head 114, and actuator 112 shown in FIG. 1.

In a preferred embodiment, the standalone test system 300 is incorporated into a spin-stand (not shown separately) in which multiple discs 106 and heads 114 are supported, and a test module 310. The test module 310 includes a variable output voltage source 312, a test resistor 314, a control circuit 316 and a display device 318 for displaying a contact event voltage signature 320. The control circuit 316 in this configuration can comprise a host computer alone or in conjunction with selected circuitry from FIG. 2 configured to carry out the routine of FIG. 3. The display device 318 can comprise a monitor of the computer or a separate data acquisition device (such as a digital oscilloscope).

The variable output voltage source 312 is provided for supply of the test voltage to the read/write head 114. The test resistor 314, with a resistance value typically greater than 100K ohms, is placed in series with a magnetoresistive element 322 of the read/write head 114.

A typical magnetoresistive read/write head, such as 114, generally includes a pair of bleeder resistors 324 in parallel communication with the magnetoresistive element 322 that terminate at the surface of the read/write 114 to bleed off electrostatic charges developed during operation of the magnetoresistive element 322 of the read/write head 114. A bond line resistance, depicted by resistor 326, is developed as a result of bonding the read/write head 114 to a load arm 328 of the actuator 112. The bond line resistance is typically in the range of 100K ohms. It is noted that resistance through the spindle motor 108 (of FIG. 1) is depicted by resistor 330. Electrostatic charges that develop on the surface of the disc 110 dissipate through the motor 108 to common ground reference 332. The actuator 112, the spindle motor 108 and the variable output voltage source 312 share the common ground reference 332.

Under nominal operating conditions of the disc drive 100, electrostatic charges induce up on the surface of the disc 110, as a result of the read/write head 114 flying above the surface of the disc 110, and are typically dissipated through the spindle motor 108 to the common ground reference 332 at a rate sufficient to preclude an electrostatic discharge from the disc 110 to the read/write head 114. Electrostatic charges induce up on the surface of the read/write head 114, as a result of the disc 110 rotating beneath the surface of the read/write head 114 in conjunction with charges developed during operation of the magnetoresistive element 322 of the read/write head 114, and are typically dissipated through the actuator 112 to the common ground reference 332 at a rate sufficient to preclude an electrostatic discharge from the read/write head 114 to the disc 110.

During operation of the standalone test system 300, the disc 110 is accelerated to a nominal operating rotational velocity to develop an air bearing between the read/write head 114 and the disc 110 upon which the read/write head 114 flies. During a data read operation, the magnetoresistive element 322 is biased (i.e., set to a predetermined operating point) in order to transduce data written on a data track, such as information track 120 illustrated in FIG. 1.

As is known by those skilled in the art, the magnetoresistive element 322 may be biased by either a predetermined bias current or a predetermined bias voltage. For convenience of disclosure and without placing a limitation on the present invention, application of a bias voltage will be the means elected for biasing the magnetoresistive element 322 for describing the operation of the present invention.

With the magnetoresistive element 322 placed in a biased state, a test voltage in the range of 0.5 volts is supplied by the variable output voltage source 312 through the test resistor 314, with a resistance of substantially 100K ohms, to the biased magnetoresistive element 322. The additional voltage at the magnetoresistive element 322 is passed through the pair of bleeder resistors 324 to the surface of the read/write head 114.

Because the bond line resistance 326 is sized to accommodate dissipation of the electrostatic charges developed during normal operations of the disc drive 100, the level of electrostatic charge on the surface of the read/write head 114 increases. The increased level of electrostatic charge on the surface of the read/write head 114 sets up an electrostatic attraction between the read/write head 114 and the disc 110 which draws the read/write head 114 closer to the disc 110.

The control circuit 316 monitors the voltage level of the magnetoresistive element 322 and displays the voltage level on the display device 318 while the variable output voltage source 312 incrementally supplies the test voltage from zero volts to a predetermined threshold voltage, typically in the range of 0.5 volts. If a contact event occurs, a momentary drop in the monitored voltage results forming a contact event voltage signature 320. The momentary drop in voltage is a result of a discharge of the electrostatic charge from the surface of the read/write head 114 to the disc 110, represented by voltage path 334, that occurs either as an arc across the air bearing or as a result of physical interaction between the read/write head 114 and the disc 110.

As shown by the contact event voltage signature 320, with continued supply of the bias voltage and test voltage to the magnetoresistive element 322, the electrostatic charge on the surface of the read/write head 114 recovers causing subsequent contact events to occur. Upon occurrence of a contact event, the control circuit 316 compares the level of the voltage applied to the magnetoresistive element 322 of the read/write head 114 under test with a predetermined threshold voltage level. If the applied voltage level is less than the threshold voltage level, the read/write head 114 under test is flagged for removal and replacement. If no contact event occurs prior to attaining the threshold voltage level, the read/write head 114 under test is deemed to be a non-low flying read/write head and proceeds with the disc 110 through the balance of the manufacturing process.

It will be understood that, for disc drives having a plurality of read/write heads and corresponding discs, implementation of the contact event detection routine 200 via the standalone test system 300, each of the plurality of heads may be tested individually, concurrently or in any order or in any desired combination.

Figure 5:
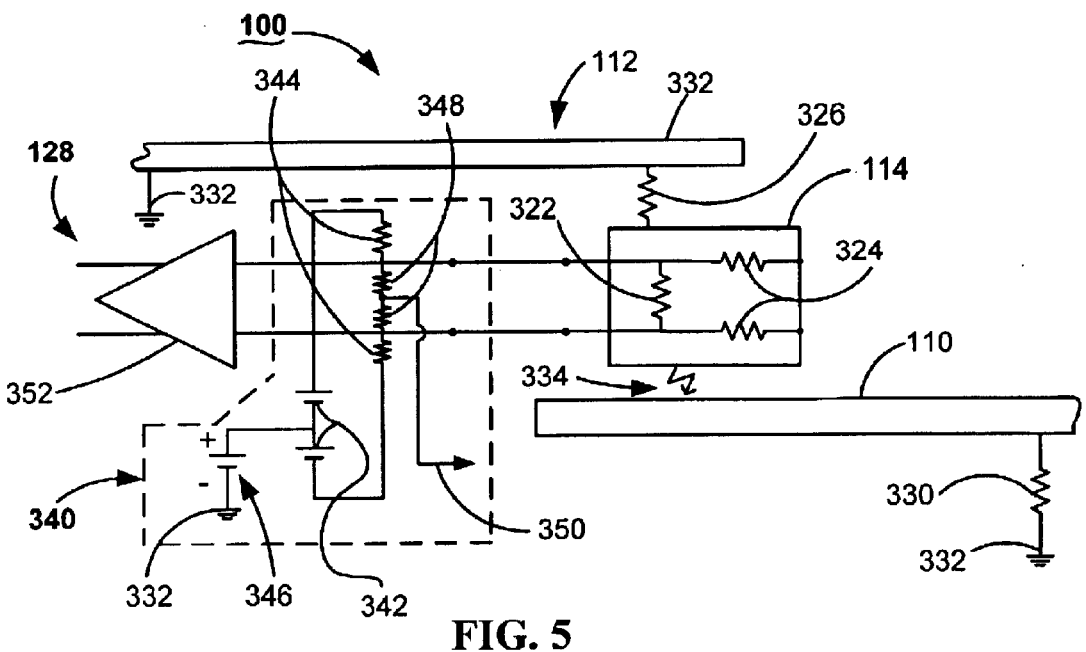
FIG. 5 is a functional block diagram of a contact event test circuit of a preamplifier/driver of the disc drive of FIG. 1.

FIG. 5 shows the preamplifier/driver 128 configured for determining presence of a low flying read/write head of the disc drive 100 based on an occurrence of a contact event voltage signature 320 of FIG. 4, the contact event test circuit 156 (of FIG. 2) communicating with the bias circuit 158 (of FIG. 2) forming a low fly height detection circuit 340 of the disc drive 100 used by the disc drive 100 to execute the contact event detection routine of FIG. 3. Included in the low fly height detection circuit 340 is: a differential voltage source 342 and a pair of bias current resistors 344 of the bias circuit 158 sized to maintain a selected bias voltage across the magnetoresistive element 322; a common mode voltage source 346, of the contact event test circuit, sized to output a disc drive model specific test voltage, typically in the range of 0.5 volts, together with a pair of test resistors 348, of the contact event test circuit 156, that typically have a resistance of substantially 100K ohms, but which are disc drive model specific; and an output line 350 for monitoring changes in the common mode voltage resulting from a contact event.

Execution of the contact event detection routine 200 (of FIG. 3), in accordance with a preferred embodiment of the present invention, by the disc drive 100 is substantially similar to the execution of the contact event detection routine 200 by the standalone test system 300 (of FIG. 4). A difference between the two implementations is that the common mode voltage source 346 augments the voltage supplied by the differential voltage source 342 in supplying the voltage applied across the magnetoresistive element 322 of the read/write head 114 to produce the electrostatic charge on the surface of the read/write head 114.

The low fly height detection circuit 340 is implemented in the preamp 128 between the magnetoresistive element 322 and a differential amplifier 352. For disc drive models utilizing a single preamp 128, each read/write head is tested independently and an occurrence of a contact event related to each head tested may be stored in a non-volatile memory portion of the disc drive 100, such as in a flash portion (not separately shown) of the controller 134 (of FIG. 2).

In the disc drive 100, configured to carry out the contact event detection routine (of FIG. 3), the controller 134 serves a substantially similar function as the control circuit 316 of the test module 310 (of FIG. 4).

When practicing the present invention, it will be understood that the rotational velocity of the disc 110 is predetermined by a product specification. The configuration of the read/write head 114 is selected to accommodate a predetermined nominal fly height during a data transfer operation of the disc drive 100 and the bond line resistance 326 is selected to meet the operating needs of the disc drive 100. As such, the common mode voltage source 346 and the pair of test resistors 348 are empirically determined to optimize the performance of the low fly height detection circuit 340.

Figure 6:
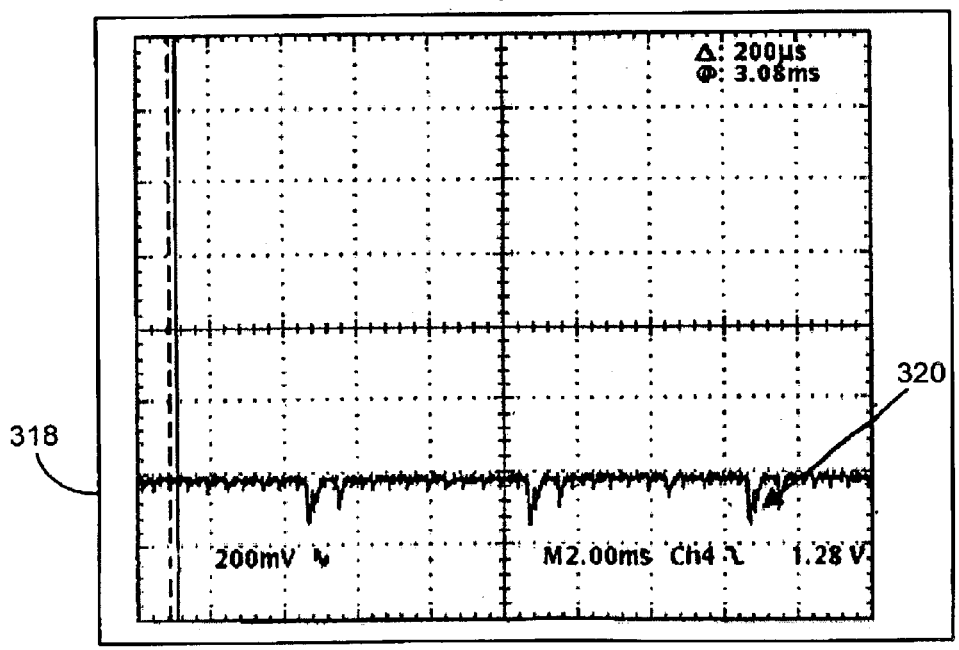
FIG. 6 is a graphical representation of a contact event voltage signature showing a response of a test voltage to a contact event of a read/write head of the disc drive of FIG. 1.

FIG. 6, shows an enlarged view of the display device 318, such as a digital oscilloscope, to provide a better perspective view of the drop and rise in voltage that occurs in the contact event voltage signature 320 resulting from an occurrence of a contact event experienced by the read/write head 114 (of FIG. 1) while voltage in excess of the bias voltage is being applied to the magnetoresistive element 322 (shown in FIG. 5) of the read/write head 114.

Accordingly, embodiments of the present invention are directed to detection of a contact event of a read/write head (such as 114) of a disc drive (such as 100) to categorize a read/write head selected for analysis as a low flying read/write head or a non low flying read/write head. The categorization is based on an occurrence of a contact event voltage signature (such as 320) occurring prior to attainment of a complete application of a predetermined threshold test voltage across a magnetoresistive element of the read/write head. The contact event voltage signature is based on a momentary drop in voltage of a predetermined level of across the magnetoresistive element (such as 322) of the read/write head.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method for detecting a low flying read/write head in a disc drive by steps comprising:

applying a voltage across a magnetoresistive element of the read/write head;

monitoring the voltage applied across the magnetoresistive element for an occurrence of a contact event voltage signature response by the voltage applied across the magnetoresistive element;

determining a level of the voltage applied across the magnetoresistive element concurrent with the occurrence of the contact event voltage signature; and comparing the level of applied voltage to a predetermined threshold level of applied voltage to determine presence of the low flying read/write head.

2. The method of claim 1, in which the read/write head is flying adjacent a disc rotating at substantially an operating rotational velocity, and in which the contact event voltage signature is formed prior to the read/write head physically interacting with the disc.

3. The method of claim 1, in which the read/write head is flying adjacent a disc rotating at substantially an operating rotational velocity, and in which the contact event voltage signature is formed concurrent with the read/write head physically interacting with the disc.

4. The method of claim 1, in which the voltage of the applying step is applied by steps comprising:

accelerating the disc attached to a spindle of the disc drive to substantially the operating rotational velocity;

developing an air bearing between the read/write head and the rotating disc;

moving the read/write head to a region of the disc inaccessible for storage of customer data;

biasing the magnetoresistive element to a bias voltage with a bias circuit; and augmenting the bias voltage with an application of a voltage with a common mode voltage source to develop an electrostatic charge on the read/write head.

5. The method of claim 4, in which the voltage applied in the augmenting step is incrementally applied from zero volts to a predetermined threshold test voltage to form the threshold voltage.

6. The method of claim 5, in which the disc drive includes a plurality of read/write heads, wherein determination of a presence of a low flying head for each of the plurality of read/write heads is made concurrently.

7. The method of claim 1, in which absence of a contact event voltage signature during the monitoring step connotes absence of a low flying read/write head.

8. A test system for determining presence of a low flying read/write head of a disc drive based on an occurrence of a contact event voltage signature, the read/write head having a magnetoresistive element and a surface, the test system comprising:
   a voltage source applying a voltage across the magnetoresistive element to induce an electrostatic charge on the surface of the read/write head;
   a test resistor disposed between the voltage source and the magnetoresistive element modulating the voltage applied to the magnetoresistive element by the voltage source;
   a control circuit communicating with the magnetoresistive element monitoring the voltage applied at the magnetoresistive element for detection of the contact event voltage signature; and
   a display device communicating with the control circuit displaying the contact event voltage signature.

9. The test system of claim 8, in which the magnetoresistive element operates at a predetermined bias voltage, and wherein the voltage source incrementally applies a test voltage concurrent with the predetermined bias voltage, in which the incrementally applied test voltage ranges from zero volts to a predetermined threshold test voltage.

10. The test system of claim 9, in which the read/write head further having a bleeder resistor disposed between the magnetoresistive element and the surface, the bleeder resistor modulating a flow of the test voltage applied to the magnetoresistive element in excess of the bias voltage to form the electrostatic charge on the surface of the read/write head.

11. The test system of claim 8, in which the disc drive comprises:
   a base deck;
   a spindle motor supported by the base deck;
   a disc with a surface attached to the base deck and adjacent the read/write head, the disc rotating at a predetermined rotational velocity;
   an air bearing developed between the disc and the read/write head by the rotation of the disc adjacent the read/write head providing spacing between the read/write head and the disc;
   an electrostatic attraction between the read/write head and the disc developed by the electrostatic charge on the surface of the read/write head reducing the spacing between the read/write head and the disc.

12. The test system of claim 11, in which the electrostatic charge on the surface of the read/write head arcs from the read/write head to the disc across the reduced space between the read/write head and the disc forming the contact event voltage signature.

13. The test system of claim 11, in which the read/write head contacts the disc to dissipate the electrostatic charge on the surface of the read/write head to the disc forming the contact event voltage signature.

14. The test system of claim 13, in which the predetermined threshold test voltage is substantially 0.5 volts.

15. The test system of claim 14, in which the test resistor is substantially 100K ohms.

16. A disc drive comprising:
   a disc rotating at a nominal rotational velocity developing an air bearing; and
   means for determining a low flying read/write head supported by the air bearing using steps for detecting the low flying read/write head supported by the air bearing.

17. The disc drive of claim 16, in which the means for determining a low flying read/write head comprises:
   a preamplifier/driver configured with a low fly height detection circuit communicating with the read/write head, the read/write head having a magnetoresistive element and a surface, the low fly height detection circuit comprising:
      a differential voltage source applying a selected bias voltage across the magnetoresistive element to bring the magnetoresistive element to an operative state;
      a bias resistor disposed between the differential power source and the magnetoresistive element operating in conjunction with the differential voltage source to maintain the selected bias voltage across the magnetoresistive element;
      a common mode voltage source communicating with the differential voltage source to incrementally induce an electrostatic charge on the surface of the read/write head;
      a test resistor disposed between the common mode voltage source and the magnetoresistive element operating in conjunction with the common mode voltage source to maintain the electrostatic charge on the surface of the read/write head; and
      an output line disposed between the test resistor and the magnetoresistive head for monitoring for an occurrence of a contact event voltage signature, the occurrence of the contact event voltage signature constitutes determination of a low flying read/write head.

18. The disc drive of claim 17, in which the steps for detecting a low flying read/write head are steps comprising:
   applying a voltage across the magnetoresistive element of the read/write head;
   monitoring the voltage applied across the magnetoresistive element for occurrence of the contact event voltage signature response by the voltage applied across the magnetoresistive element;
   determining a level of the voltage applied across the magnetoresistive element concurrent with the occurrence of the contact event voltage signature; and
   comparing the level of applied voltage to a predetermined threshold level of applied voltage to determine presence of the low flying read/write head.

19. The method of claim 18, in which the contact event voltage signature is formed by a discharge of the electrostatic charge from the surface of the read/write head via an arcing of the electrostatic charge from the surface of the read/write head through the air bearing to the surface of the disc.

20. The method of claim 18, in which the contact event voltage signature is formed by a discharge of the electrostatic charge from the surface of the read/write head via the read/write head physically interacting with the disc.

* * * * *